(12) United States Patent
Meyer

(10) Patent No.: US 7,846,027 B2
(45) Date of Patent: Dec. 7, 2010

(54) HANDHELD ELECTRONIC DEVICES

(75) Inventor: Axel E. Meyer, Helsinki (FI)

(73) Assignee: Nokia Corporation, Espoo (FI)

( * ) Notice: Subject to any disclaimer, the term of this patent is extended or adjusted under 35 U.S.C. 154(b) by 483 days.

(21) Appl. No.: 11/444,157

(22) Filed: May 30, 2006

(65) Prior Publication Data

US 2007/0293316 A1    Dec. 20, 2007

(51) Int. Cl.
    *A63F 13/00*    (2006.01)
(52) U.S. Cl. .............................. 463/46; 463/36; 463/38; 463/47; 273/150; 273/330; 273/406; 361/679.3; 361/679.11; 361/69.56; 379/433.12; 379/433.13; 455/575.1; 455/575.3; 455/575.4
(58) Field of Classification Search ............. 463/46–47, 463/20, 36, 38, 43, 53, 56; 273/148 B, 150, 273/329–330, 406–407; 345/169; 361/679.3, 361/679.08, 679.09, 679.11, 679.55, 679.56, 361/679.59; 700/66, 168; 455/90.3, 556.1, 455/556.2, 575.1, 575.2, 575.3, 575.4; 379/433, 379/12, 433.13; *A63F 13/00, 13/08*
See application file for complete search history.

(56) References Cited

U.S. PATENT DOCUMENTS

| | | | |
|---|---|---|---|
| 5,375,831 A | 12/1994 | Hsien-Chung | |
| 5,440,629 A * | 8/1995 | Gray | 379/433.12 |
| 5,719,936 A * | 2/1998 | Hillenmayer | 379/447 |
| 5,786,789 A * | 7/1998 | Janky | 342/357.1 |
| 5,898,774 A * | 4/1999 | Shindo | 379/433.13 |
| 5,907,615 A * | 5/1999 | Kaschke | 379/433.12 |
| 6,184,804 B1 * | 2/2001 | Harrison | 341/22 |
| 6,483,445 B1 * | 11/2002 | England | 341/22 |
| 6,510,325 B1 * | 1/2003 | Mack et al. | 455/575.2 |
| 6,539,208 B1 * | 3/2003 | Mori | 455/575.3 |
| 6,542,721 B2 * | 4/2003 | Boesen | 455/553.1 |
| 6,591,069 B2 * | 7/2003 | Horiguchi | 396/429 |
| 6,743,100 B1 * | 6/2004 | Neiser | 463/37 |
| 6,751,473 B1 * | 6/2004 | Goyal et al. | 455/556.1 |
| 6,821,204 B2 * | 11/2004 | Aonuma et al. | 463/32 |
| 6,850,784 B2 * | 2/2005 | SanGiovanni | 455/575.1 |
| 7,065,835 B2 * | 6/2006 | Kuramochi | 16/357 |
| 7,092,747 B2 * | 8/2006 | Park et al. | 455/575.4 |
| 7,099,702 B1 * | 8/2006 | Lundy | 455/566 |

(Continued)

FOREIGN PATENT DOCUMENTS

EP    1 536 614    6/2005

(Continued)

OTHER PUBLICATIONS

European Patent Office Communication (Application No. 07252195.8-2414) dated Oct. 18, 2007, Form 1507N (2 pages) and Annex to European Search Report (1 page).

*Primary Examiner*—Peter DungBa Vo
*Assistant Examiner*—Arthur O. Hall

(57) ABSTRACT

A handheld electronic device, the device comprising a housing and a retractable handle, the device being arranged to allow the handle to be retracted into the housing along a sliding axis to provide a retracted handle position and extended out of the housing along the sliding axis to provide an extended handle position, and wherein the handle is arranged to be formable to be held by a user in the extended position such that the holding axis of the handle in the extended position is offset from the sliding axis.

25 Claims, 4 Drawing Sheets

U.S. PATENT DOCUMENTS

| | | | |
|---|---|---|---|
| 7,107,018 B2 * | 9/2006 | Jellicoe | 455/90.3 |
| 7,129,928 B2 * | 10/2006 | Young et al. | 345/161 |
| 7,138,962 B2 * | 11/2006 | Koenig | 345/1.3 |
| 7,159,833 B2 * | 1/2007 | Kato | 248/349.1 |
| 7,187,363 B2 * | 3/2007 | Nguyen et al. | 345/168 |
| 7,269,450 B2 * | 9/2007 | Lee et al. | 455/575.1 |
| 7,283,847 B2 * | 10/2007 | Kim | 455/566 |
| 7,292,882 B2 * | 11/2007 | Lee et al. | 455/575.4 |
| 7,419,099 B2 * | 9/2008 | Lee et al. | 235/472.01 |
| 7,447,528 B2 * | 11/2008 | Puranen | 455/575.1 |
| 7,460,108 B2 * | 12/2008 | Tamura | 345/169 |
| 7,522,945 B2 * | 4/2009 | Kilpi et al. | 455/575.1 |
| 7,526,082 B2 * | 4/2009 | Abe et al. | 379/433.11 |
| 7,577,466 B2 * | 8/2009 | Kim | 455/575.4 |
| 7,580,726 B2 * | 8/2009 | Maatta et al. | 455/550.1 |
| 2003/0073462 A1 * | 4/2003 | Zatloukal et al. | 455/558 |
| 2004/0137940 A1 * | 7/2004 | Matsunami | 455/550.1 |
| 2004/0180703 A1 * | 9/2004 | Kim et al. | 455/575.1 |
| 2004/0229662 A1 * | 11/2004 | Chadha | 455/575.1 |
| 2005/0113155 A1 * | 5/2005 | Kim et al. | 455/575.4 |
| 2005/0124394 A1 * | 6/2005 | Kim et al. | 455/575.3 |
| 2005/0148395 A1 * | 7/2005 | Kim et al. | 463/46 |
| 2006/0025184 A1 * | 2/2006 | Cho et al. | 455/575.4 |
| 2006/0128449 A1 * | 6/2006 | Park | 455/575.4 |
| 2007/0018948 A1 * | 1/2007 | Chen et al. | 345/156 |

FOREIGN PATENT DOCUMENTS

WO    01/99481    12/2001

\* cited by examiner

HANDHELD ELECTRONIC DEVICES

FIELD OF THE INVENTION

The present invention relates to improvements in or relating to handheld electronic devices. Although the devices may be handheld in use, such devices do not necessarily have to be handheld to be used. The electronic devices may comprise user interface elements allowing the user to control one or more functions of the electronic device or another electronic device associated with the electronic device.

The electronic devices according to the invention may provide one or more of radiotelephone (communications), audio/image (still and/or video) capturing/recording/playing functionality. Thus, electronic devices which can make telephone/video calls, play/record still/video images (e.g. still/video camera functionality, possibly but not always with sound) and/or play/record music audio (e.g. MP3 or other format audio player/recorder) are within the scope of the present invention.

The invention can also be applied to electronic devices which allow a user to play electronic games which can be displayed on a display on the electronic device or on a display separate to the electronic device. The electronic devices of the present invention may provide remote control functionality of another electronic device, so for example, the electronic device can control a robot (e.g. to control the movement or one or more other operation of the robot) and/or a television (e.g. to control the channel being displayed or one or more of the other operation performable with/by the television).

BACKGROUND TO THE PRESENT INVENTION

As electronic devices get increasingly smaller there is an increasing need to provide electronic devices which are compact but which can still be comfortably held by a user during operation of the electronic device.

SUMMARY OF THE INVENTION

A handheld electronic device, the device comprising a housing and a retractable handle, the device being arranged to allow the handle to be retracted into the housing along a sliding axis to provide a retracted handle position and extended out of the housing along the sliding axis to provide an extended handle position, and wherein the handle is arranged to be formable to be held by a user in the extended position such that a holding axis of the handle in the extended position is offset from the sliding axis.

The hands of a user generally surround the holding axis when the handle is held. In use of the device, the holding axis is the axis about which the handle is generally held by a user when using the electronic device.

The handle or a portion of the handle may arranged to be rotatable with respect to the sliding axis such that the holding axis of the handle or handle portion in the extended position is offset from the sliding axis.

The handle or handle portion may be arranged to be rotatable about a rotation axis which is offset from the sliding axis.

The handle may comprise a first part and a second part, wherein the second part is rotatable with respect to the first part, the first part being substantially held within the housing in the extended handle position and the second part being holdable by the user during use of the electronic device, wherein the first and second parts are arranged such that the holding axis of the second part is offset from the sliding axis in the extended position and aligned with the sliding axis in the retracted position.

The first and second parts may be arranged to be rotatable with respect to one another about a rotation axis which is offset from the sliding axis.

The handle or a portion of the handle may be arranged to be repeatably bendable with respect to the sliding axis such that the holding axis of the handle or handle portion is offset from the sliding axis in the extended position.

The handle or a portion of the handle may be arranged to be foldable with respect to the sliding axis such that the holding axis of the handle or handle portion is offset from the sliding axis in the extended position is offset from the sliding axis.

The handle may be formable such that the holding axis in the extended position is in the same plane as the sliding axis. The handle may be formable such that the holding axis in the extended position is in a different plane from the sliding axis.

The holding axis in the extended position may be perpendicular to the sliding axis. The angle formed between the handle in the extended position and the housing may be an obtuse angle between 91 degrees and 179 degrees. The angle may be in the range 95-175 degrees, 100-170, 105-165, 110-160, 115-155, 120-150, 125-145, 130-140 or any combination of the upper and lower range limits mentioned.

The handle may be arrangeable to define a number of different angles between the handle in the extended position and the housing.

The handle may be formable such that, in the in-use orientation of the electronic device, the sliding axis is parallel to the user and the extended end of the handle is closer to the user than the electronic device housing.

The device may comprise handles along opposing sides of the electronic device allowing the holding of extended handles separately by each hand of a user.

The housing may comprise one or more electronic displays. A display may be located centrally to two opposing retractable handles.

The housing adjacent the retractable handle may comprise one or more user input elements, one or more of the user input elements being arranged to allow a user to control the functionality of the device. One or more of the user input elements may provide scrolling functionality and/or selection functionality, the selection functionality, for example, allowing a user to select an item from a menu.

The user input elements may be, for example, one or more keys, joysticks, roller balls, and/or electronic displays, including all conventional user input elements and future developments thereof.

One or more user input elements and/or user interface elements may be comprised on the handle. Electronic device components may or may not be comprised within the handle.

One or more of the user input elements may be arranged to be operable by movement of the thumb of a user. Movement of the thumb may be by straightening of the thumb and/or arced movement of the thumb.

The device may be rectanguloid and the sliding axis may be aligned with the longitudinal axis of the rectanguloid electronic device.

The device may have a high aspect ratio, the length being substantially larger than the width. The device may have a thickness substantially smaller than the width. The device may be considered to be thin. The device may be sized to fit into the shirt/trouser pocket of a user.

The extended handle may be curved, flat and/or have one or more undulations.

The handle may be arranged to be comfortably grippable in the extended position around an outwardly facing handle surface.

The handle may be arranged to be grippable by curving fingers underneath the handle, leaving the thumb free to actuate one or more user input elements.

The handle may be retractable partially into the housing. The handle may be substantially retractable into the housing. The handle may be fully retractable into the housing but be arranged to allow the handle to be extended by user actuation. User actuation may be actuation of a user input element.

The handle may be biased into the extended position. The handle may be biased into the retracted position. The handle may be arranged to be motorized into the extended position. The handle may be arranged to be manually extended.

The handle may be user lockable/releasable in the extended and/or retracted positions.

The housing may be the external housing of the electronic device or an internal housing of the electronic device. The device may be arranged for single-handed operation or two-handed operation.

The device may have two or more handles.

The device may be configured to be useable by more than one user at the same time.

According to a second aspect, the present invention provides a retractable electronic device handle, the handle being arranged to be housed within the housing of an electronic device, the handle being arranged to be retracted into the housing along a sliding axis to provide a retracted handle position and extended out of the housing along the sliding axis to provide an extended handle position, and wherein the handle is arranged to be formable to be held by a user in the extended position such that the holding axis of the handle in the extended position is offset from the sliding axis.

One or more features in combination or isolation, taken from one or more aspects and/or embodiments, are within the scope of the present invention whether or not mentioned in isolation or that combination. Corresponding means for performing one or more of the functions described are within the scope of the present disclosure.

BRIEF DESCRIPTION OF THE FIGURES

Various embodiments of the present invention will now be described with reference to the following figures in which.

DETAILED DESCRIPTION OF SPECIFIC EMBODIMENTS

Figure 1:
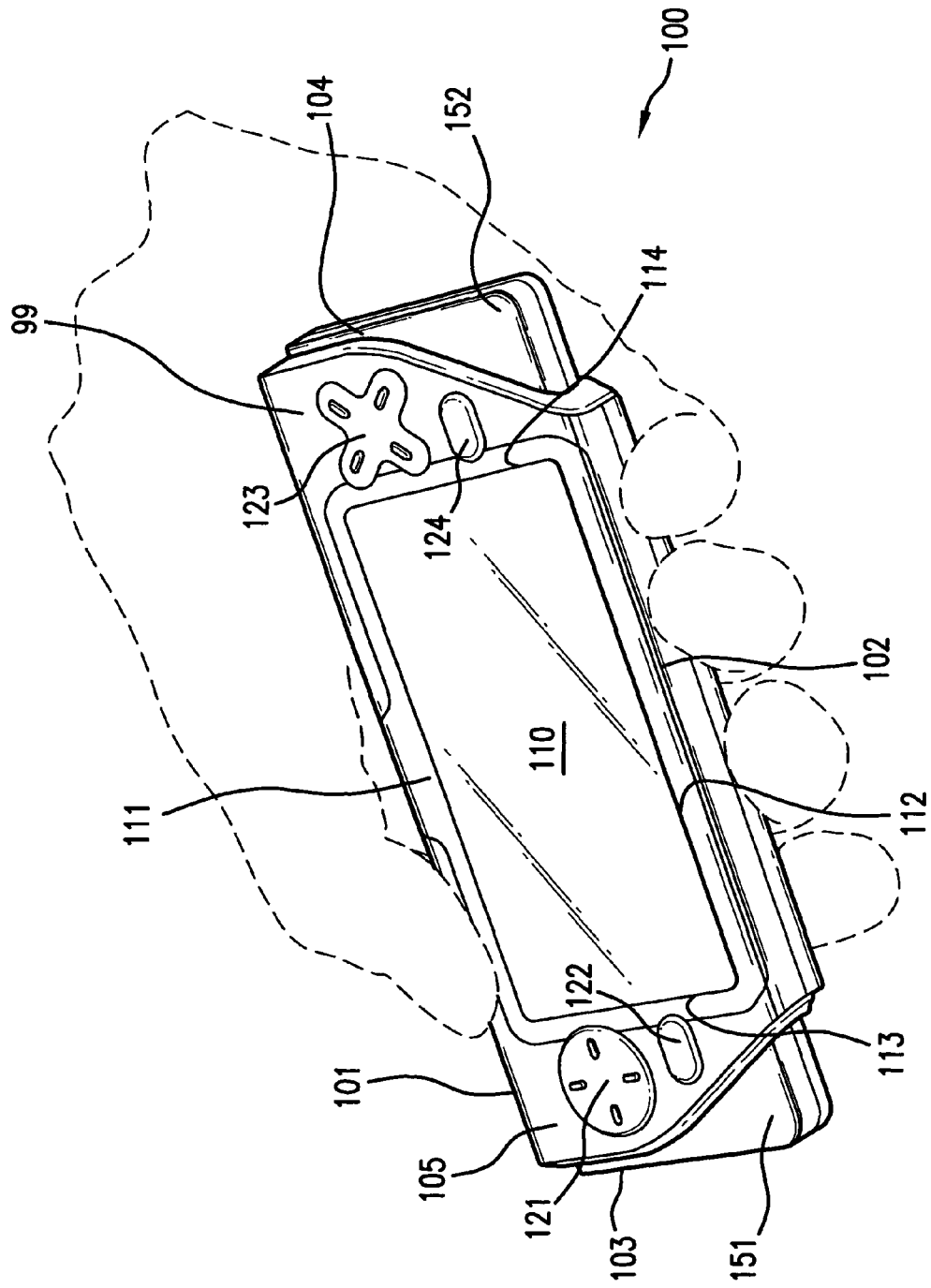
FIG. 1 illustrates one embodiment of a handheld electronic device according to the present invention.

An example of an electronic device according to the present invention is shown in FIG. 1. In this particular embodiment, the electronic device 100 is substantially rectanguloid in shape. Accordingly, it has two longitundinal sides 101, 102 and two lateral sides 103,104. The device is comparatively thin in cross section and is sized to be of the order of the size of an adult hand. Other embodiments can be sized to be of the order of a child's hand. As shown in FIG. 1, the device is sized to be comfortably carried/held in the hand of a user. In the embodiment of FIG. 1, the device is substantially flat, but in other embodiment (not shown) the device 100 may not be substantially flat (e.g. could be curved/spherical/hemispherical and/or comprise angular/undulating projecting features).

The device 100 has a rectangular flat front face 105 to be presented to a user during use. Again, although the particular embodiment is shown to have a flat front face 105, other embodiments of the device could have non-flat front faces (e.g. curved/spherical/hemispherical/angular/undulating projecting features). The rectangular front face 105 comprises a centrally located rectangular display 110, the display having two longitundinal sides 111, 112 and two lateral sides 113, 114. The longitundinal sides 101, 102 of the device 100 and the longitundinal sides 111, 112 of the display are aligned.

On either lateral side 113, 114 of the display 110 are respective input elements 121, 122 and 123, 124. The input elements 121-122 are sized and positioned to be adjacent and in between the respective lateral sides 103, 113. Similarly input elements 123-124 are sized and positioned to be adjacent and inbetween the respective lateral sides and 104, 114. In this case, the display 110 does not provide any user input functionality. However, in other embodiments, one or more parts of the display may be user actuated to control one or more functions of the device.

In this particular example, the device 100 is a computer gaming console, input elements 121, 122 being provided for user input by the left hand of a user and input elements 123, 124 being provided for input by the right hand of user. The games are displayed on the display 110, but in other embodiments, the games can additionally or alternatively be provided for display on another electronic device associated with the device. In the present case, the device 100 also allows the user to make radiotelephone calls (e.g. using cellular telephone functionality), take pictures (camera on reverse of device 100 is not shown), and play recorded/streamed audio (e.g. music/speech etc).

Figure 2:
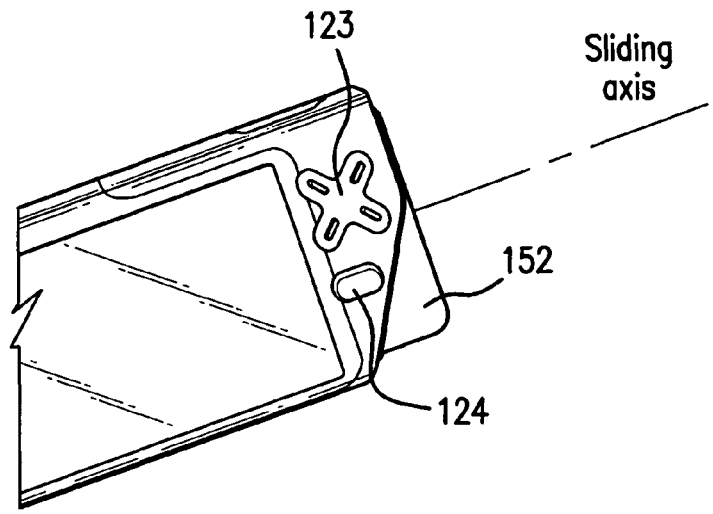
FIG. 2 shows a close up of one corner of the electronic device of FIG. 1 showing the handle in a retracted configuration.
Figure 3:
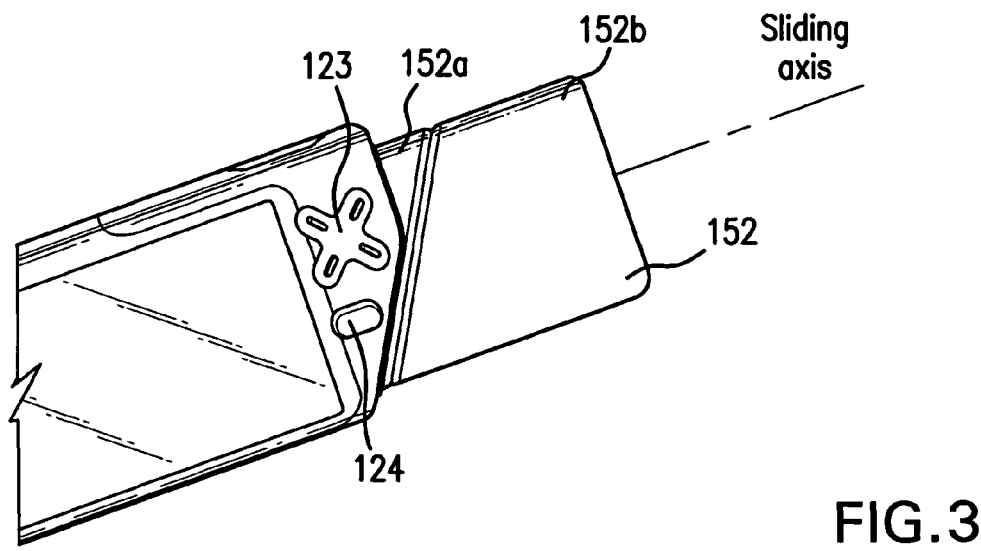
FIG. 3 shows a close up of one corner of the electronic device of FIG. 1 showing the handle in an extended configuration.

The exterior housing 99 of the electronic device comprises apertures on either lateral side 103, 104 of the device 100. The apertures are arranged to locate respective retractable handles 151, 152. The handles are slideable into and out of the housing 99 to define respective retracted and extended positions of the handles 151, 152. In the embodiment shown, the handles 151, 152 both do not fully retract to disappear into the housing 99, and the handles 151, 152 are slideable along the longitudinal axis of the device 100 (FIGS. 2, 3). The device is arranged to allow the handles 151, 152 to be releasably lockable (mechanisms not shown) in the fully retracted and extended positions.

FIG. 3 shows a close up of the handle 152 in one extended position. In this case, the handle 152 is fully extended. The handles 151, 152 comprise two mating parts 151a, 151b and 152a, 152b respectively. The respective parts 151a,b and 152a,b for each handle slide out together along the sliding axis. They are rotatably joined together at an angle to the sliding axis. Parts 151b, 152b are manually rotatable with respect to parts 151a, 152a such that the rotation axis is not aligned with the sliding axis.

Rubber elements 160 are provided along the mating edges of the parts 151a,b and 152a,b. The rubber elements 160 are provided to make a reliable seal between the mating edges which are rotatable.

Figure 4:
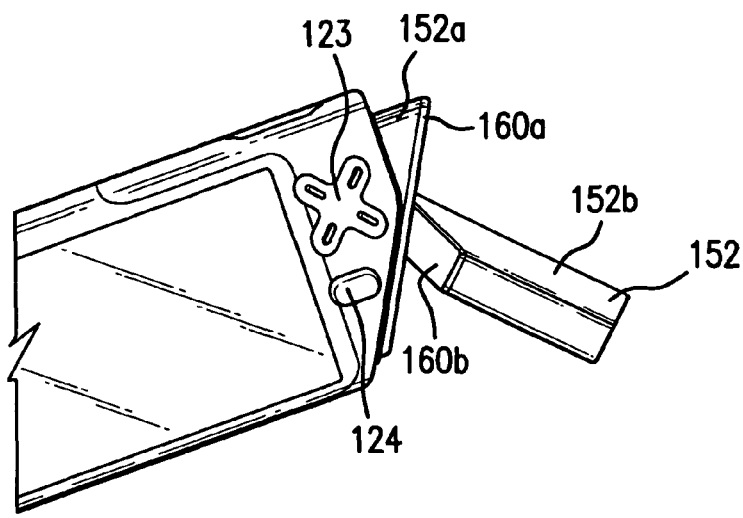
FIG. 4 shows a close up of one corner of the electronic device of FIG. 1 showing the handle in an extended rotated configuration.
Figure 5:
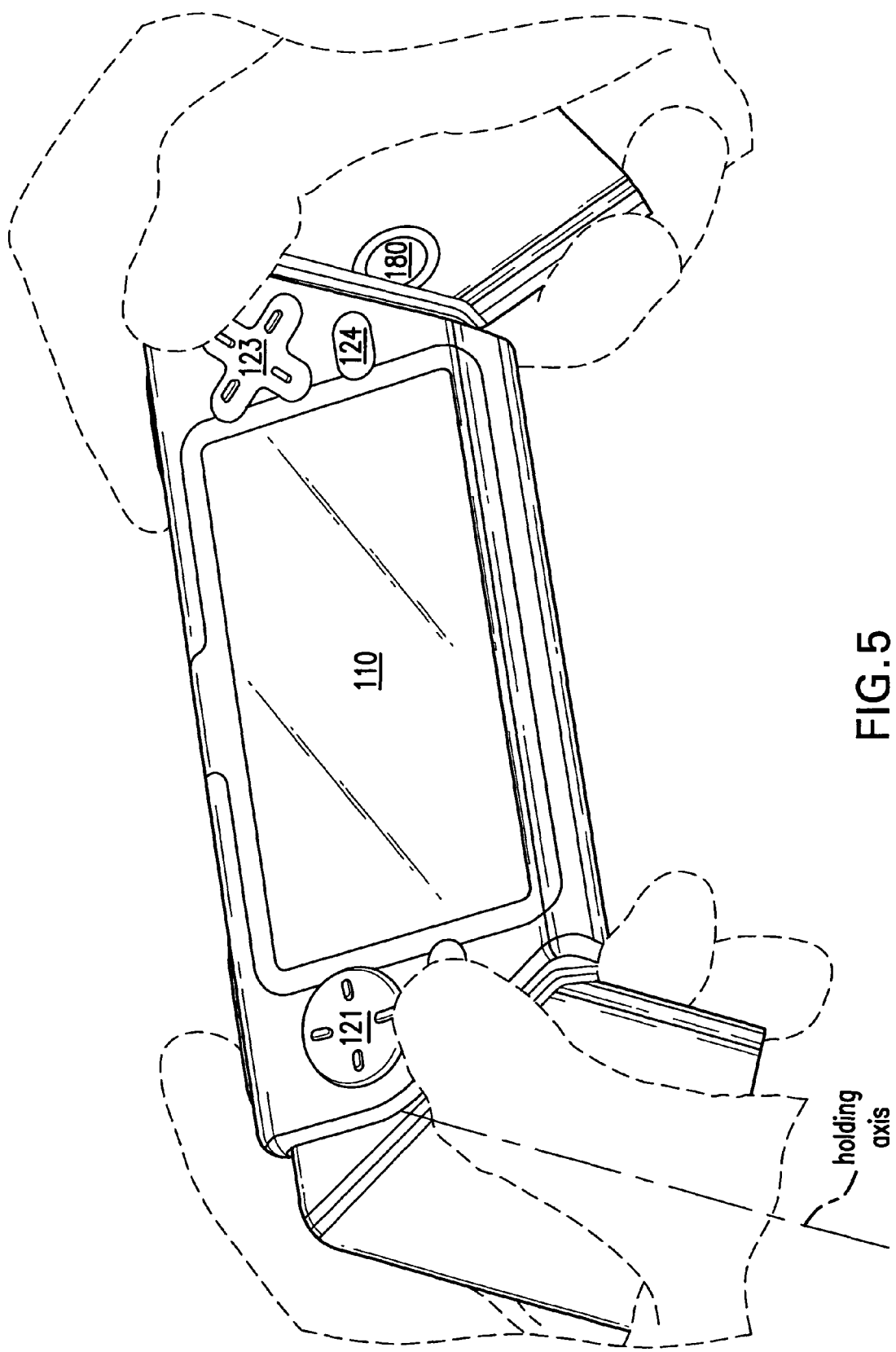
FIG. 5 shows the handheld electronic device of FIG. 1 with handles at both ends extended and rotated into the in-use configuration.
Figure 6:
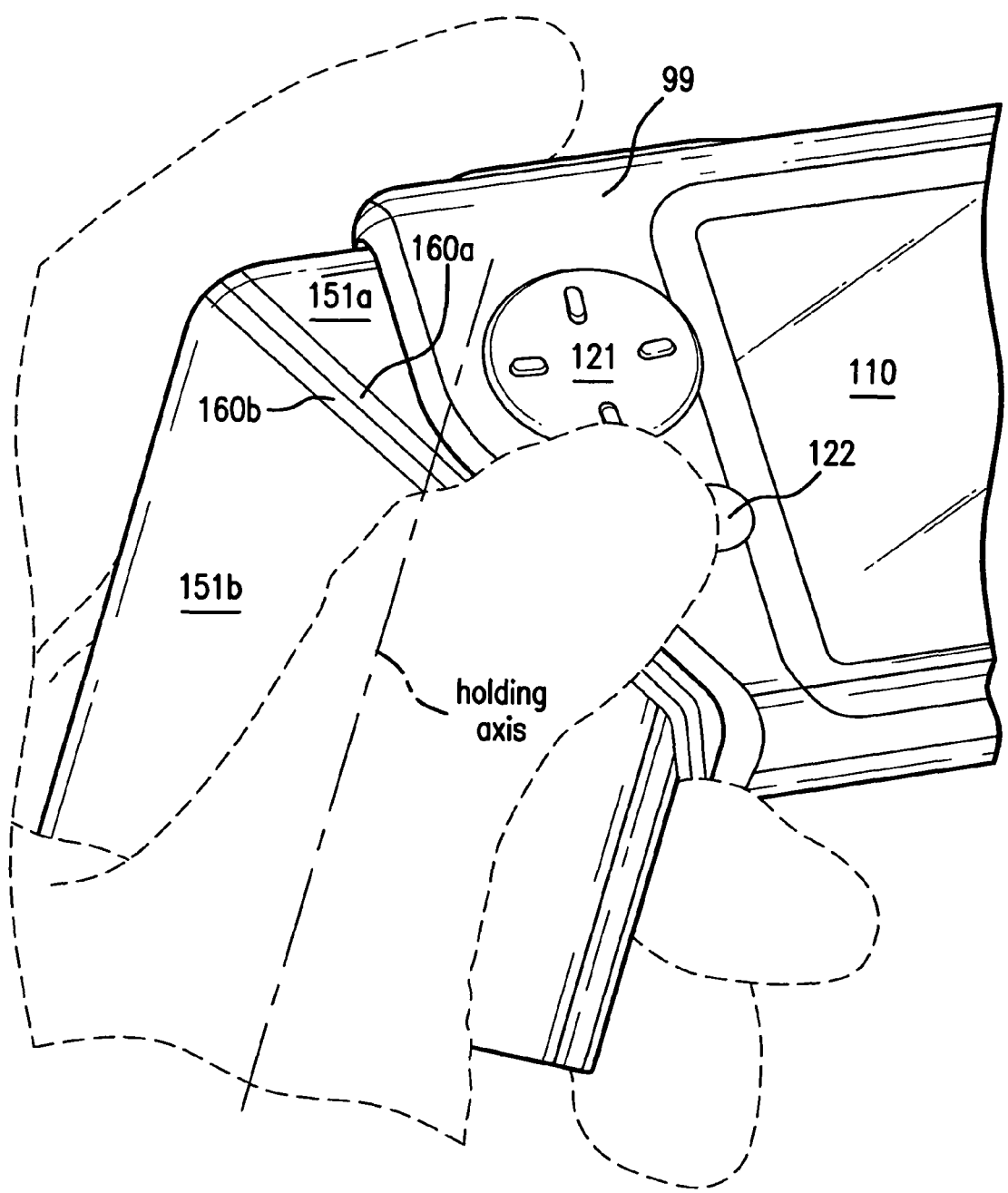
FIG. 6 shows a close up of the left corner of the electronic device of FIG. 1.

FIG. 4 shows that part 152b has been rotated out of the paper with respect to FIG. 3. Continued rotation will provide the configuration of the handle of FIG. 5 in which the holding axis of the handle is offset from the sliding axis. This provides comfortable gripping of the device 100 as shown in FIGS. 5 and 6.

The handle 152 has a user input element 180 which is revealed when the handle 152 is extended and shown facing the user when the part 152b is rotated into a user facing orientation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It will be appreciated that the invention is not limited to the specific embodiments discussed. The device can be configured to only have one handle. Other shapes of devices (including oval, elliptical, square and combinations of these forms), and handles are within the scope of the invention. The handle could be repeatably bent into shape to provide the offset extended position. This can be done by a suitable choice of material. The handle could be foldable upon itself, the folded handle being slideable into the housing and the unfolded housing providing the offset extended position. The handle could be arranged to be telescopic to increase its length in the direction of the holding axis.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A retractable handle for an electronic device, the handle comprising two mating parts comprising a first mating part and a second mating part, the handle being configured to be housed within a housing of the electronic device, the handle being configured to be:
    retracted through an aperture in the housing and into the housing along a sliding axis of the handle to provide a retracted handle position so that the first mating part disappears into the housing and the second mating part disappears in part but does not fully disappear into the housing so as to leave at least a corner of the second mating part exposed; and
    extended so as to reappear through the aperture in the housing and out of the housing along the sliding axis to provide an extended handle position, wherein the handle is configured to be formable to be held by a user in the extended position such that the second mating part of the handle in the extended position is bendable away from the sliding axis and into a holding position so that a holding axis of the second mating part is offset from the sliding axis, and wherein said handle is configured to be housed within said housing on one side thereof with another handle configured to be housed within said housing on an opposing side thereof so as to allow holding of second mating parts of extended handles separately bent by each hand of a user when in use while viewing an electronic display on said housing disposed in between said extended handles.

2. A handheld electronic apparatus, the apparatus comprising a housing and a retractable handle comprising two mating parts comprising a first mating part and a second mating part, the apparatus being configured to allow the handle to be:
    retracted through an aperture in the housing and into the housing along a sliding axis of the handle to provide a retracted handle position so that the first mating part disappears into the housing and the second mating part disappears in part but does not fully disappear into the housing so as to leave at least a corner of the second mating part exposed; and
    extended so as to reappear through the aperture and out of the housing along the sliding axis to provide an extended handle position, wherein the handle is configured to be formable to be held by a user in the extended position such that the second mating part of the handle in the extended position is bendable away from the sliding axis and into a holding position so that a holding axis of the second mating part is offset from the sliding axis, and wherein said handle is configured to be housed within said housing on one side thereof with another handle configured to be housed within said housing on an opposing side thereof, so as to allow holding of second mating parts of extended handles bent separately into said holding position by each hand of a user when in use while viewing an electronic display on said housing disposed in between said separately held extended handles.

3. A handheld electronic apparatus according to claim 2, wherein the apparatus is a module for a handheld electronic device.

4. An apparatus according to claim 2 wherein the second mating part of the handle is configured to be rotatable with respect to the sliding axis.

5. An apparatus according to claim 2 wherein the second mating part of the handle is configured to be rotatable about the holding axis.

6. An apparatus according to claim 2 wherein the second mating part is rotatable with respect to the first mating part, the first mating part being substantially held within the housing in the extended handle position and the second mating part being holdable by the user during use of the electronic apparatus, wherein the first and second mating parts are configured such that the holding axis of the second mating part is offset from the sliding axis in the extended position and aligned with the sliding axis in the retracted position.

7. An apparatus according to claim 6 wherein the first and second mating parts are configured to be rotatable with respect to one another about the holding axis which is offset from the sliding axis.

8. An apparatus according to claim 2 wherein the second mating part of the handle is configured to be repeatably bendable with respect to the sliding axis such that the holding axis of the second mating part of the handle is offset from the sliding axis in the extended position.

9. An apparatus according to claim 2 wherein the second mating part of the handle is configured to be foldable with respect to the sliding axis such that the holding axis of the second mating part of the handle is offset from the sliding axis in the extended position.

10. An apparatus according to claim 2 wherein the holding axis in the extended position is perpendicular to the sliding axis.

11. An apparatus according to claim 2 wherein the angle formed between the handle in the extended position and the housing is an obtuse angle.

12. An apparatus according to claim 2 wherein the angle formed between the handle in the extended position and the sliding axis is in the range of one or more of 95-175, 100-170, 105-165, 110-160, 115-55, 120-150, 125-145, and 130-140 degrees.

13. An apparatus according to claim 2 wherein the second mating part of the handle is configurable to define a number of different angles between the second mating part of the handle in the extended position and the sliding axis.

14. An apparatus according to claim 2 wherein the second mating part of the handle is formable such that, in the in-use orientation of the electronic apparatus, the sliding axis is parallel to a user and an extended end of the second mating part of the handle is closer to the user than the housing of the handheld electronic apparatus.

15. An apparatus according to claim 2 wherein a part of the housing adjacent the retractable handle comprises one or more user input elements, one or more of the user input elements configured to allow a user to control the functionality of the apparatus.

16. An apparatus according to claim 15 wherein one or more of the user input elements are configured to be operable by movement of a thumb of a user.

17. An apparatus according to claim 2 wherein the user input elements are selected from a list comprising one or more keys, joysticks, roller balls, and/or electronic displays.

18. An apparatus according to claim 2 wherein the retractable handle comprises one or more user input elements.

19. An apparatus according to claim 2 wherein the handheld electronic apparatus is rectanguloid and the sliding axis is aligned with a longitudinal axis of the rectanguloid handheld electronic apparatus.

20. An apparatus according to claim 2 wherein the second mating part of the retractable handle is configured to be comfortably grippable in the extended position around an outwardly facing handle surface.

21. An apparatus according to claim 2 wherein the second mating part of the retractable handle is configured to be grippable by curving fingers underneath the second mating part of the retractable handle, leaving a thumb free to actuate one or more user input elements.

22. An apparatus according to claim 2 wherein the first mating part of the retractable handle is biased into the extended position.

23. An apparatus according to claim 2 wherein the handheld electronic apparatus is configured to be useable by more than one user at a same time.

24. An apparatus according to claim 2, wherein the apparatus provides one or more of: gaming functionality; radio-telephone functionality; camera functionality; audio functionality.

25. A handheld electronic apparatus, the apparatus comprising a means for housing and a means for holding comprising two mating parts comprising a first mating part and a second mating part, the apparatus being configured to allow the means for holding to be:

retracted through an aperture in the means for housing and into the means for housing along a sliding axis to provide a retracted means for holding position so that the first mating part disappears into the housing and the second mating part does not fully retract to disappear into the housing so that at least a corner of the second mating part is left exposed; and extended so as to reappear through the aperture in the means for housing and out of the means for housing along the holding axis and the sliding axis to provide an extended means for holding position, wherein the means for holding is configured to be formable to be held by a user in the extended position such that the second mating part of the means for holding in the extended position is bendable away from the sliding axis and into a holding position so that a holding axis of the second mating part is offset from the sliding axis, and wherein said means for holding is configured to be housed with said means for housing on opposing sides thereof so as to allow holding of second mating parts of said means for holding bent into said holding position by separate hands of a user on said opposing sides of said means for housing when in use while viewing an electronic display on said means for housing disposed in between said hands of said user.

* * * * *